United States Patent [19]

Kana et al.

[11] Patent Number: 4,575,917
[45] Date of Patent: Mar. 18, 1986

[54] METHOD AND APPARATUS FOR ASSEMBLING SPIRAL WOUND GASKET RINGS INTO GAUGE RINGS

[75] Inventors: Kenneth W. Kana; Willie H. Kana; Francis L. Seidel, all of Houston, Tex.

[73] Assignee: Fluorocarbon/Sepco, Houston, Tex.

[21] Appl. No.: 706,954

[22] Filed: Feb. 28, 1985

[51] Int. Cl.⁴ .................... B21D 39/00; B23P 11/00; B23Q 1/00; B23Q 3/00
[52] U.S. Cl. .................................. 29/520; 29/283.5; 277/1; 277/204
[58] Field of Search .................. 29/517, 520, 283.5; 277/204, 1

[56] References Cited

U.S. PATENT DOCUMENTS

| | | | |
|---|---|---|---|
| 2,536,821 | 1/1951 | Rappl | 29/520 UX |
| 3,304,602 | 2/1967 | Osborne | 29/520 UX |
| 4,019,244 | 4/1977 | Owen et al. | 29/520 |
| 4,203,191 | 5/1980 | Gibson, Sr. | 277/204 X |

FOREIGN PATENT DOCUMENTS

| | | | |
|---|---|---|---|
| 579856 | 7/1959 | Canada | 29/520 |
| 3201263 | 7/1983 | Fed. Rep. of Germany | 29/520 |
| 1213243 | 11/1970 | United Kingdom | 277/204 |

Primary Examiner—Charlie T. Moon
Attorney, Agent, or Firm—Vinson & Elkins

[57] ABSTRACT

A method and apparatus for assembling an inner spiral wound gasket ring (12) within an outer concentric gauge ring (14). The inner gasket ring (12) is first positioned loosely within the outer concentric gauge ring (14) and the combined rings (12, 14) are then positioned within a tapered opening (28) beneath a mandrel (19). Mandrel (19) is then moved downwardly within tapered opening (28) into contact with gauge ring (14) to move gauge ring (14) downwardly along the tapered surface defining the opening (28). Radial deformation of the outer gauge ring (14) occurs to move inner peripheral surface (64) of ring (14) radially inwardly so that a bead (58) on the gasket ring (12) is received within a groove (66) on the gauge ring (14) thereby to maintain the concentric rings (12, 14) in assembled position.

6 Claims, 6 Drawing Figures

METHOD AND APPARATUS FOR ASSEMBLING SPIRAL WOUND GASKET RINGS INTO GAUGE RINGS

BACKGROUND OF THE INVENTION

This invention relates generally to the method and apparatus for assembling spiral wound gasket rings within gauge rings.

A spiral wound gasket or gasket ring consists of alternate layers of spirally wound metal strip and asbestos or other suitable sealing material. Three or four loose turns or wraps of the metal strip alone without the sealing material are usually provided at the outer periphery of the gasket ring and these turns are spot welded along the outer periphery to hold the metal strip in wound relation. The gasket ring which is of a thickness greater than the metal ring is then inserted within an outer metal gauge ring with the metal ring retaining the gasket ring in retained position, but not so tight that the gasket cannot be rotated relative to the metal gauge ring.

The metal strip forming the gasket ring has a radially extending bead or ridge projecting outwardly from its outer periphery and the outer metal gauge ring has an annual groove or indentation along its inner periphery adapted to receive the radially extending bead thereby to hold the gasket ring in assembled position.

Heretofore, the outer metal ring and inner gasket ring have been assembled by various methods utilizing associated apparatus for carrying out the several methods. As an example of one type of method and apparatus, reference is made to U.S. Pat. No. 4,203,191 issued May 20, 1980 to Vernon W. Gibson, Sr., in which a method and apparatus are shown for providing inwardly directed radial forces along the outer periphery of a spiral wound gasket causing the gasket to decrease in diameter sufficiently to slip into a corresponding annular groove in a metal gauge ring. The gasket is pushed downwardly through a frusto-conical or tapered opening to decrease the diameter of the gasket and into the center of a gauge ring held in fixed position below the gasket. Upon a release of the mandrel which applies the radial forces the gasket expands outwardly into a relatively tight fit within the groove of the metal gauge ring.

Another example of prior art is shown in U.S. Pat. No. 4,019,244 issued Feb. 17, 1976 to A. B. Owen, et al, in which a spiral wound gasket assembly is formed by positioning the gasket having a bead along its outer periphery formed adjacent a groove of an outer metal ring. Dies having metal working portions are employed to form deformations or circumferential indentations in the gauge ring at selected points along the circumference of the groove to deform the groove and tighten the gasket ring therein. The amount of deformation or indentation of the groove in the gauge ring varies in accordance with the desired tightness of the gasket ring in the groove.

It is clear from the foregoing that it is difficult to obtain a uniform fit between the gasket and the outer ring. The crimping or cold flowing of metal into a void space by metal working only at spaced selected areas is normally not uniform, particularly with the outer periphery of the gasket or gasket ring being subject to variations in size. Further any deformation of the gasket could result under some circumstances in permanent deformation, and the outward expansion after such deformation might not be sufficient to perform the fit desired in the after gauge ring. Also, since the sealing is obtained by the gasket, no deformation of the gasket after the gasket is spirally wound is desired so as not to affect the sealing characteristic in any manner.

SUMMARY OF THE INVENTION

This invention relates to a new and improved method and apparatus for assembling a spiral wound gasket or gasket ring into an outer gauge ring. The spiral wound gasket in the form of a ring is formed of alternate layers of spirally wound metal strip and sealing material, such as asbestos, and the metal strip of the gasket has a radially extending bead or ridge projecting outwardly from its outer periphery which is adapted to be received within a facing inner peripheral groove or indentation along the inner periphery of outer gauge ring. The method and apparatus of this invention are directed particularly to a gauge ring which is deformed radially inwardly uniformly about its inner and outer peripheries thereby to move the groove radially inwardly about the bead on the outer periphery of the opposed gasket for retaining the gasket in assembled relation. Thus, a retaining fit is formed about the entire outer circumference of the gasket.

The method of this invention is carried out in a minimum number of steps and in a minimum of time with a complete cycle being performed in less than five (5) seconds. First, the outer ring with the inner gasket loosely therein is positioned within a tapered opening in a movable support and the support is then moved horizontally under a mandrel. The gasket ring is of a thickness greater than the thickness of the gauge ring, and the upper surface of the movable support member and the lower surface of the mandrel are each formed with an indentation therein to receive the increased thickness of the gasket ring. During assembly, the gauge ring is supported along its lower face by the movable support member and supported along its outer periphery by the frusto-conical surface of the tapered opening. In this position, downward movement of the mandrel pushes the outer ring and lower support member downwardly a predetermined distance. Thus, the outer ring is pressed along the surface defining the tapered opening thereby to deform radially the inner and outer peripheries of the gauge ring. The inward radial deformation of the outer ring positions the inner groove thereof about the opposed bead on the gasket ring, thereby to retain the gasket in an assembled relation.

A stop for the movable support member limits the downward movement of the outer ring, and the amount of downward travel together with the degree of taper in the opening determine the radial deformation of the groove. For example, with a taper of around fifteen degrees (15°), a downward movement of the gauge ring around 3/16 inch will provide the desired fit. After the lower support member is bottomed, the mandrel is released and the spring-urged support member lifts the assembled gasket and gauge rings to their original raised position in which position a puller removes the assembled rings from the frusto-conical opening.

It is an object of this invention to provide a method of assembling spiral wound gasket rings into gauge rings utilizing a minimum number of steps so that an assembly cycle may be performed in a minimum of time.

Another object of this invention is to provide apparatus for carrying out the method in a minimum number of steps by deforming the outer gauge ring radially inwardly into an assembled relation with an inner gasket ring to retain the gasket ring therein.

Apparatus illustrating features of this invention and for carrying out the improved method is illustrated in the accompanying drawings forming a part of this application, in which.

Figure 1:
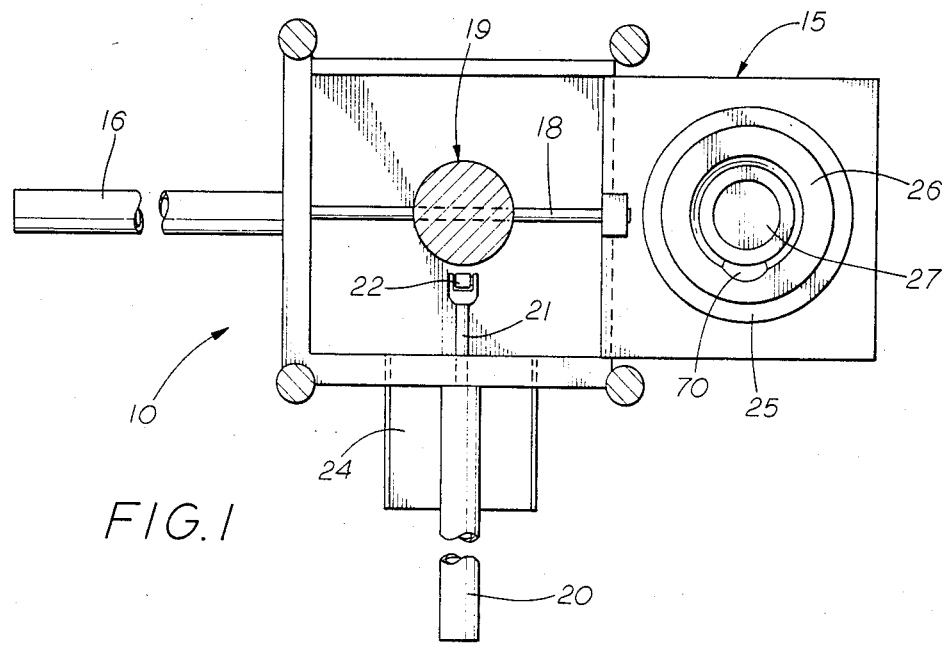
FIG. 1 is a diagramatic view of the apparatus of this invention illustrating the gauge ring and gasket ring in position within a tapered opening on a reciprocating support base for movement beneath a mandrel for final assembly.
Figure 2:
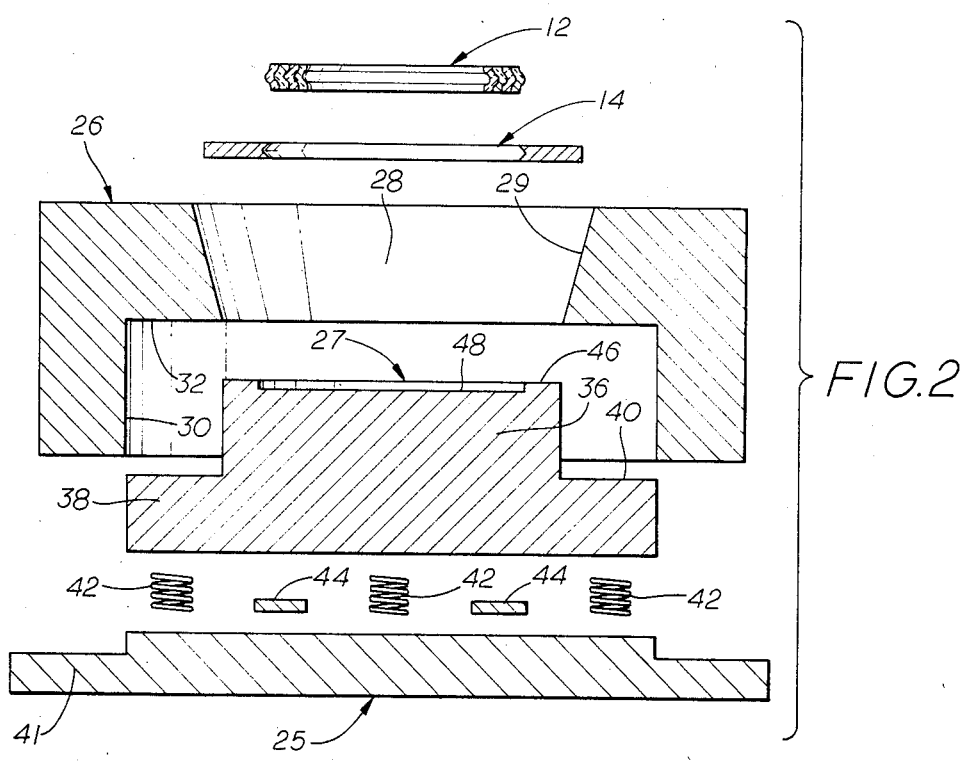
FIG. 2 is an exploded view of the rings and the support base for the rings as shown in FIG. 1.

Referring now to the drawings for a better understanding of the invention, an apparatus generally indicated 10 is provided to carry out the method of this invention in assembling a spiral wound gasket ring generally indicated at 12 within an outer gauge ring generally indicated at 14. Apparatus 10 is pneumatically operated by suitable pneumatic controls and includes a reciprocating support indicated generally at 15. A fluid cylinder 16 has a piston rod 18 connected to support 15 for moving support 15 back and forth between the position shown in FIG. 1 for initially receiving rings 12 and 14 in disassembled relation, and an assembly position in which the support 15 is positioned beneath a pneumatically operated mandrel indicated generally at 19.

Gasket ring 12 is first positioned loosely within outer gauge ring 14 on movable support 15 and then moved beneath mandrel 19 for assembly as will be explained below. After the assembly operation a puller including a cylinder 20 having a piston rod 21 connected to a pivoted finger 22 is actuated to move the pivoted ringer over the assembled rings 12, 14 and then finger 22 engages an inner rim of the assembled rings to pull the assembly from movable support 15 into a downwardly inclined discharge chute 24 for collection at a desired location.

Referring now to FIGS. 2-6 for a more detailed illustration of apparatus 10, movable support 15 comprises a lower support base 25, an upper support ring 26 supported on base 25, and a movable support member 27 positioned between lower base 25 and support ring 26. Support ring 26 has a central frustro-conical or downwardly tapering opening 28 defining a frustro-conical surface 29. An enlarged diameter opening 30 is formed beneath tapered opening 26 and defines a shoulder 32. Movable support member 27 has an upper cylindrical body 36 and a lower enlarged body portion 38 forming a circumferential flange having an upper shoulder 40 thereon which is adapted to engage in abutting relation shoulder 32 on support ring 26.

Lower support base 25 has an annular support flange 41 on which support ring 26 is supported. Coil springs 42 are positioned between base 25 and movable support member 27 to urge shoulders 32 and 40 into engagement. Stops 44 limit the downward movement of movable support member 27. The upper surface of movable support member 27 includes an upper annular surface 46 surrounding an indented lower surface 48.

Mandrel 19 is positioned in vertical alignment with movable support member 27 and has a lower annular face or surface 52 surrounding an upper circular indented surface 54. Surfaces 46 and 48 are complementary to surfaces 52 and 54, respectively.

Gasket ring 12 is made up of a spirally wound thin metal strip 56 having a bead or protuberance positioned centrally of its width at 58. Alternate layers of asbestos or similar sealing material 60 are provided to separate the layers of the metal strip 56. However, the inner and outer peripheries of gasket ring 12 are provided with several wraps of metal strip 56 which do not have layers 60 therebetween. For example, the inner end of strip 56 may have around three (3) to six (6) turns before the asbestos layer 60 is started. The outer periphery normally has around three turns of metal strip 56 after the asbestos layer 60 is terminated. The end spirals or wraps are spot welded to hold the wraps together. This forms a tightly wound asbestos ring as the wrappings are tightly wound one upon the other. The metal gauge ring 14 has an outer periphery formed at 62 and has its inner periphery 64 defining an annular groove 66 therein. In assembled relation, bead 58 will be received within groove 66 as will be described further.

Figure 5:
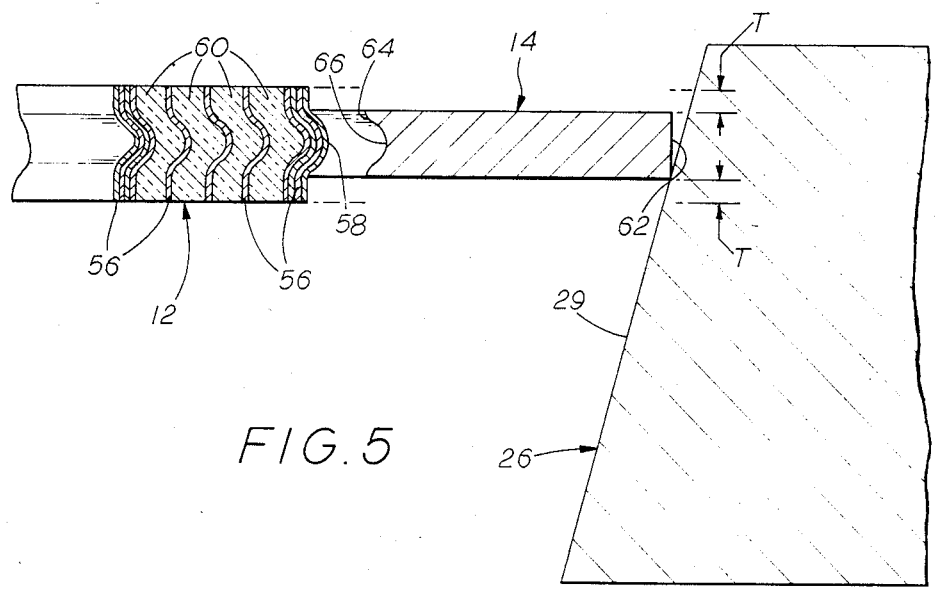
FIG. 5 is an enlarged fragment of FIG. 3 showing in enlarged detail the tapered opening and associated rings fitting therein.
Figure 6:
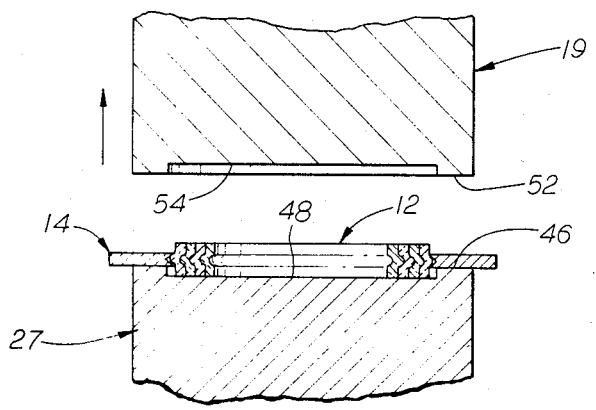
FIG. 6 is an enlarged section of the mandrel and subjacent movable support with the mandrel shown in slightly raised position.

As shown in FIG. 5, the thickness of gasket ring 12 is substantially greater than gauge ring 14 as the sealing between opposed flanges receiving assembled rings 12 and 14 is accomplished by gasket ring 12. As an example, ring 14 has a thickness of 0.125 inch and asbestos ring 12 has a thickness of 0.175 inch. Thus, asbestos ring 12 will project from the adjacent surface of gauge ring 14 a distance "T" of 0.025 inch. This increase in thickness of gasket ring 12 permits gasket ring 12 to be compressed between two opposed flanges for sealing therebetween.

In operation, gasket rings 12 and 14 are positioned within tapered opening 28 of support ring 26 in the position shown in FIG. 1. Then, the assembly cycle is commenced by an operator actuating a pneumatic control. First, movable support 15 is moved by cylinder 16 to a position beneath mandrel 19. It is noted that in this position, outer peripheral surface 62 of ring 14 is in engagement with tapered surface 29. Ring 14 is also supported on upper surface 46 of movable support member 27 and indented upper surface 48 receives gasket ring 12. The indentation of lower surface 48 corresponds to the increase in thickness of the gasket ring 12. In this position, mandrel 19 moves downwardly with surface 52 engaging ring 14 and indented surface 54 receiving gasket ring 12. Mandrel 19 moves ring 14 downwardly along inclined surface 29, thereby deforming and moving inner peripheral surface 64 of ring 14 radially inwardly so that bead 58 is received within groove 66 thereby to maintain gasket ring 12 and gauge ring 14 in assembled position.

Figure 3:
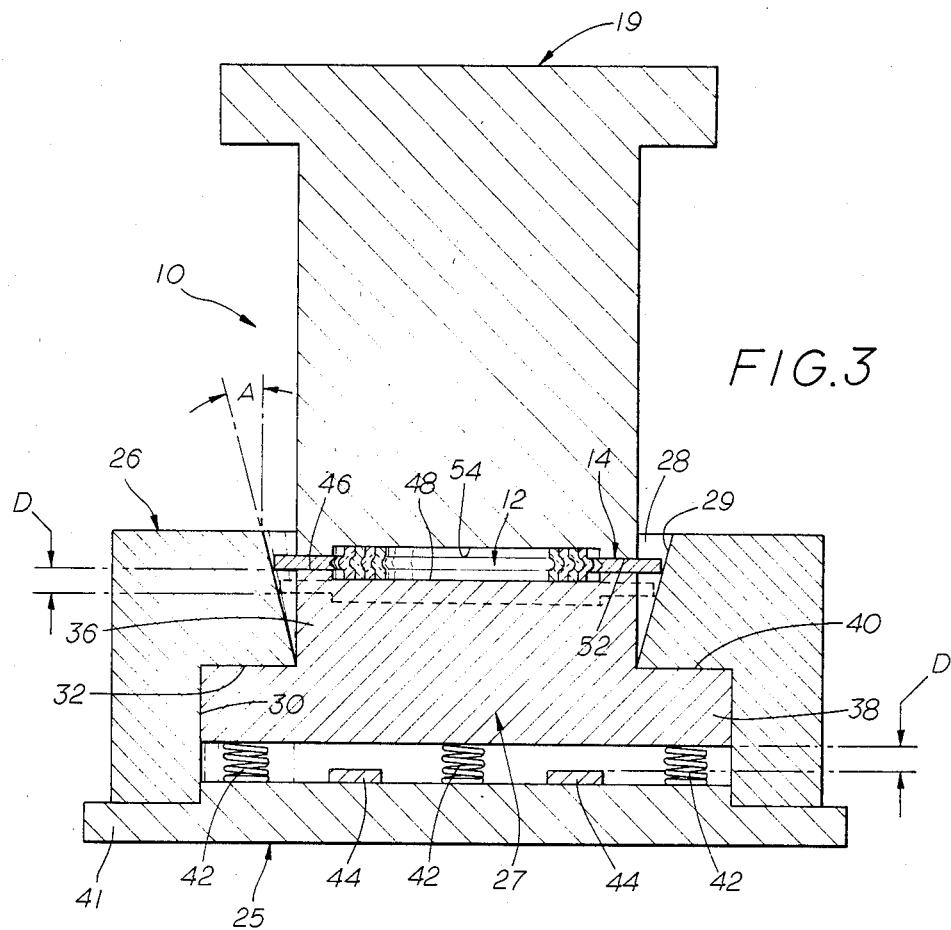
FIG. 3 is an enlarged sectional view of a fragment of the apparatus showing the gauge ring and gasket ring therein after initially being placed within the tapered opening of the supporting base.
Figure 4:
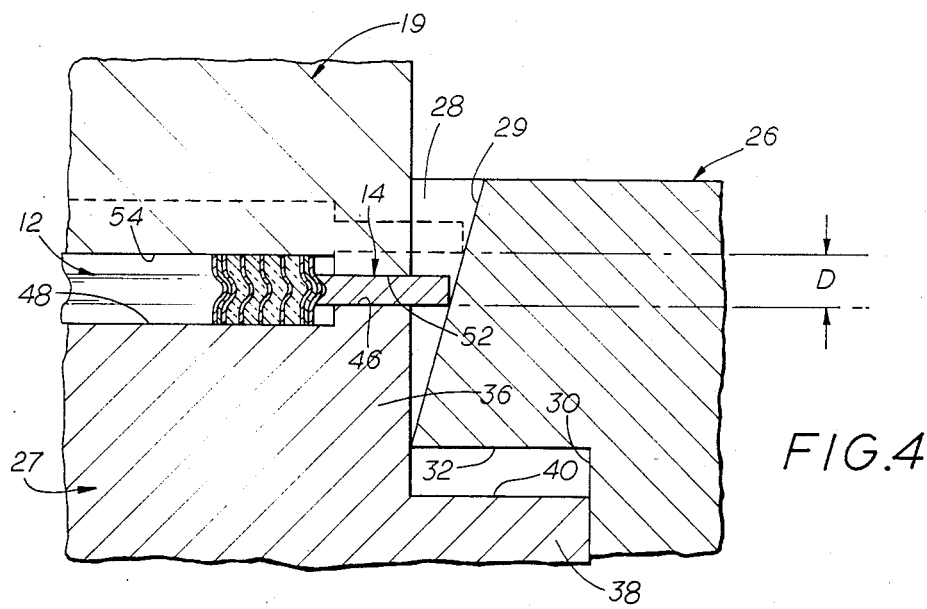
FIG. 4 is an enlarged sectional view similar to FIG. 3 but showing the mandrel at the end of its downward stroke after the outer gauge ring has been deformed radially inwardly about the gasket ring to retain the gasket ring in assembled relation.

For the specific example set forth above, mandrel 19 moves downwardly a distance "D" of around 3/16 inch. To obtain the desired radial deformation of gauge ring 14, tapered opening 28 has its surface 29 disposed preferably at an angle A as shown in FIG. 3 of around fifteen degrees (15°) with respect to the vertical. It has been found that angle A between around eight degrees (8°) and twenty-two degrees (22°) would function satisfactorily although an angle of around fifteen degrees (15°) has been found to be optimum.

The downward movement of mandrel 19 is controlled by stops 44 and when movable support member 27 engages stops 44, mandrel 19 is released and returns to its original position. When this occurs, coil springs 42 urge support member 27 upwardly until shoulders 32 and 40 engage. At this position, cylinder 20 moves pivoted finger 22 over assembled rings 12 and 14 and within the opening therein. Then, the movement of cylinder 20 is reversed and finger 22 engages the inner rim or circumference of gasket ring 12 to pull rings 12 and 14 into chute 24 which is positioned at an elevation below support ring 26. It is noted that the upper rim defining opening 28 is beveled at 70 to facilitate movement of rings 12 and 14 from opening 28.

A complete cycle takes about five (5) seconds and a pressure of around sixty-five (65) pounds per square inch is applied by mandrel 19 to ring 14 to deform ring 14 into the completed assembly. It is noted that indented surfaces 48 and 54 receive the increased thickness portion of ring 12. Thus, ring 12 is not depressed or deformed in any manner during this operation, thereby retaining its sealing capacity.

In view of the foregoing, it will be seen that an improved method and apparatus has been provided for assembling spiral wound gasket rings into gauge rings in a minimum of time and with minimum malfunctioning. The method utilizes gasket and gauge rings which have already been loosely combined prior to the commencement of the assembly cycle and no separate means are required to hold a gauge ring in position during assembly.

What is claimed is:

1. A method of assembling a spiral wound gasket ring of the type embodying a metal strip having a radially projecting outer circumferential bead into a mating annular groove along the inner periphery of an outer gauge ring comprising:
    positioning the outer gauge ring and inner spiral wound gasket ring within a tapered opening of a supporting base so that the outer periphery of said gauge ring is in engagement with the adjacent tapered surface defining the tapered opening and the inner periphery thereof is in opposed relation to the bead of said gasket ring while supported on a movable support member extending upwardly within said tapered opening beneath the gauge ring; and
    then applying a downward force on said gauge ring to move said gauge ring downwardly along said tapered surface and to move said movable support member downwardly simultaneously whereby the inner periphery of said gauge ring is deformed radially inwardly so that the bead of said spiral wound gasket ring is received within said annular groove for retaining the gasket ring within the gauge ring in assembled relation.

2. A method of assembling a spiral wound gasket ring of the type embodying a metal strip having a radially projecting outer circumferential bead into a mating annular groove along the inner periphery of an outer gauge ring comprising:
    positioning in concentric relation a loosely combined outer gauge ring and inner gasket ring within a frustrocohical opening of a reciprocal movable support so that the outer periphery of said gauge ring is in engagement with the adjacent frusto-conical surface defining the frusto-conical opening and is supported on a movable support member extending upwardly within said opening beneath the gauge ring;
    next moving the movable support and rings in a generally horizontal direction beneath the mandrel; and
    then moving the mandrel downwardly into engagement with said gauge ring to move said gauge ring downwardly along said frusto-conical surface and to move said movable support member downwardly simultaneously whereby the inner periphery of said gauge ring is deformed radially inwardly so that the bead of said spiral wound gasket ring is received within the annular groove of said gauge ring for retaining the gasket ring within the gauge ring in assembled relation.

3. Apparatus for assembling a spiral wound gasket ring having a radially projecting outer circumferential bead thereon into a mating annular groove along the inner periphery of a concentric outer gauge ring comprising:
    a support having a frusto-conical opening therein adapted to receive the concentric gasket and gauge rings therein with the frusto-conical surface defining said opening engaging the outer periphery of said gauge ring;
    a support member projecting upwardly within said frusto-conical opening adapted to support the gauge ring thereon,
    means mounting said support member for vertical movement relative to said support; and
    a mandrel mounted for movement downwardly within said frusto-conical opening and adapted to engage said gauge ring and press the gauge ring downwardly along the frusto-conical surface of said opening for deforming said gauge ring radially inwardly thereby to move said groove on said gauge ring radially inwardly to receive the bead on said gasket ring for retaining the gasket ring in assembled concentric relation with said gauge ring.

4. An apparatus for assembling an inner spiral wound gasket ring having a radially projecting outer circumferential bead thereon within a concentric outer gauge ring having an annular groove along its inner periphery in opposed relation to said bead; said apparatus comprising:
    a support base having a downwardly tapered opening therein receiving the concentric gasket and gauge rings with a tapered surface defining the opening engaging the outer periphery of the gauge ring;
    a support member on said support base mounted within said opening and having an upper horizontal annular surface surrounding an indented lower horizontal circular surface to receive respectively the gauge ring and gasket ring;
    means mounting the support within the opening for vertical movement relative to the support base; and
    a mandrel mounted for downward movement within the tapered opening and having a lower horizontal annular surface surrounding an indented upper, horizontal circular surface to receive respectively the gauge ring and the gasket ring with said surfaces on said mandrel being in opposed relation to the corresponding surfaces on said support member; said mandrel upon downward movement thereof engaging and pressing said gauge ring downwardly along the tapered surface of said opening for deforming said gauge ring radially inwardly, thereby to move said groove on the gauge ring radially inwardly to receive the bead on said gasket ring in retaining relation.

5. An apparatus for assembling an inner spiral wound gasket ring and a concentric gauge ring comprising:

support means movable horizontally back and forth between a load position in which the rings are initially positioned for assembly and an assembly position in which the concentric rings are pressed into assembled position; said support means having a lower base, an upper support ring supported on said lower base and having a central downwardly tapered opening therein adapted to receive the rings therein, and a vertically movable support member mounted between said support ring and said lower base and projecting upwardly within said tapered opening for supporting the rings therein;

a mandrel positioned over said support means in said assembly position and mounted for up and down vertical movement; and reciprocating means to move the support means back and forth between said load position and said assembly position; said mandrel, upon positioning of said support means in said assembly position with said rings within said tapered opening, moving downwardly to engage and move said outer ring downwardly along the tapered surface defining said tapered opening to deform said outer ring radially inwardly into assembled position about said inner gasket ring.

6. An apparatus as set forth in claim 5 wherein resilient means are positioned between said movable support member and said lower base to urge continuously said movable support member upwardly.

* * * * *